US010514893B1

(12) United States Patent
Vakili

(10) Patent No.: US 10,514,893 B1
(45) Date of Patent: Dec. 24, 2019

(54) APPARATUSES AND METHODS FOR PSEUDO-RANDOM NUMBER GENERATION

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 4 days.

(21) Appl. No.: 15/911,967

(22) Filed: Mar. 5, 2018

(51) Int. Cl.
G06F 7/58 (2006.01)
H04L 9/32 (2006.01)
H04L 9/08 (2006.01)

(52) U.S. Cl.
CPC ............ *G06F 7/582* (2013.01); *H04L 9/0869* (2013.01); *H04L 9/32* (2013.01)

(58) Field of Classification Search
CPC .......... G06F 7/582; H04L 9/0869; H04L 9/32
USPC ................................. 708/250–256
See application file for complete search history.

(56) References Cited

U.S. PATENT DOCUMENTS 9,628,272 B2 4/2017 Rostami et al.
9,692,595 B2 6/2017 Lowans et al.
2008/0060014 A1* 3/2008 Bentley ............... G06F 16/4387 725/52
2016/0328211 A1 11/2016 Nordholt et al.
2017/0019423 A1 1/2017 Kotwal et al.
2018/0316487 A1* 11/2018 Choi ....................... G06F 7/725

FOREIGN PATENT DOCUMENTS

| WO | WO 2003/049363 A1 | 6/2003 |
| WO | WO-2016/191176 A1 | 12/2016 |
| WO | WO 2017/004470 A1 | 1/2017 |
| WO | WO 2017/078804 A1 | 5/2017 |

OTHER PUBLICATIONS

Oren, Y. et al., *WIPR—Pubic Key Identification on Two Grains of Sand*, Work on RFID Securlty (2008) 13 pages.

* cited by examiner

*Primary Examiner* — Tan V Mai
(74) *Attorney, Agent, or Firm* — Alston & Bird LLP

(57) ABSTRACT

A method, apparatus, and computer program product for improved pseudo-random number generation are provided. An example method includes receiving, by a computing device, a request for a pseudo-random number, selecting, by extraction circuitry of the computing device, a first parameter from a server parameter dataset, and obtaining a first value for the first parameter. The method further includes selecting, by the extraction circuitry, a second parameter, and obtaining a second value for the second parameter. The method includes generating, by transformation circuitry, the pseudo-random number based on the first value and the second value.

20 Claims, 5 Drawing Sheets

APPARATUSES AND METHODS FOR PSEUDO-RANDOM NUMBER GENERATION

TECHNOLOGICAL FIELD

Example embodiments of the present invention relate generally to pseudo-random number generation and, more particularly, to the use of server parameters to improve pseudo-random number generation.

BACKGROUND

While computing devices are capable of performing increasingly complex calculations and functions, attempts at configuring a computing device to perform a truly random operation have largely failed. This is because, at a fundamental level, computing devices operate by following instructions to complete tasks. Due to their deterministic nature, computing devices struggle to generate truly random numbers, and historical tools for "random" number generation have been pseudo-random, insofar as they utilize methods and instructions that can be reproduced if the inputted data and transformations are known. In this way, computing devices attempt to mimic true statistical randomness but do not actually achieve it.

In some instances, pseudo-random numbers are used as a means for securing or otherwise authenticating a session or other interaction between two devices by serving as a unique session identifier. Traditional methods for generating pseudo-random numbers for authenticating a session, however, have become increasingly susceptible to attack as the availability of computing power has increased. Perpetrators now may utilize this increased computing power, along with access to a user's device or information, to exploit the vulnerability of traditional pseudo-random number generation techniques. Furthermore, due to the current prominence of data collection and the associated quantity of information available about any particular user, pseudo-random numbers generated based upon a user's personal information face an increased risk due to the increased likelihood that the personal information may be known by an attacker.

BRIEF SUMMARY

To address these issues and others, example implementations of embodiments of the present invention may utilize a transformation or convolution of independent server parameters to increase the sophistication of the pseudo-random number generation process and thereby reduce or eliminate the exposure of a pseudo-random number generator to an attack that might work against more straightforward pseudo-random number generation techniques. Embodiments of the present disclosure provide a hardened session identifier by transforming at least one pseudo-randomly selected server parameter with at least one other pseudo-randomly selected server parameter in order to generate a unique seed for generation of the pseudo-random number used to establish a corresponding secure session. For example, the method may select one of various possible server parameters (e.g., processor core temperature, processor core voltage, dynamic random-access memory ("DRAM") temperature, DRAM voltage, system temperature, system voltage, fan speed, processor speed, processor core usage percentage, memory usage percentage, cache usage percentage, or the like) of a server and then obtain a value for the selected server parameter. The method may then transform or convolute the server parameter data with a value obtained for another server parameter. The transformed or convoluted data is then used to generate a pseudo-random number. In this way, example embodiments increase session security over techniques using more traditional pseudo-random number generation methods by requiring a perpetrator to (1) access state information about an independently protected server (e.g., supported or otherwise protected by an authenticating entity) to extract each of a server's various operating parameters, (2) select the correct server parameters, and (3) learn the appropriate transformation applied using the steps describe above. Traditional methods do not invoke all of these confounding steps and are thus more vulnerable to attack.

Systems, apparatuses, methods, and computer program products are disclosed herein for improved pseudo-random number generation. In one embodiment, with reference to the claimed method, a method generating pseudo-random numbers is provided. The method may include receiving, by a computing device, a request for a pseudo-random number, selecting, by extracting circuitry of the computing device, a first parameter from a server parameter dataset, and obtaining a first value for the first parameter. The method may further include selecting, by the extraction circuitry, a second parameter from the server parameter dataset, and obtaining a second value for the second parameter. The method may include generating, by transformation circuitry of the computing device, the pseudo-random number based on the first value and the second value.

In some embodiments, the method may further include, in response to obtaining the second value for the second parameter, selecting, by the extraction circuitry, a third parameter from the server parameter dataset, and obtaining a third value for the third parameter. The method may further include generating, by the transformation circuitry, the pseudo-random number based on the third value. In such an embodiment, the method may further include, in response to obtaining the third value for the third parameter, selecting, by the extraction circuitry, a fourth parameter from the server parameter dataset and obtaining a fourth value for the fourth parameter. The method may further include generating, by the transformation circuitry, the pseudo-random number based on the fourth value.

In some embodiments, the method may further include receiving, by communications circuitry of the computing device, an instruction to generate a session identifier from a first user device associated with a first user. In such an embodiment, the method may include determining, by session establishment circuitry of the computing device, that the request for the session identifier requires the pseudo-random number, and generating, by the session establishment circuitry, the session identifier based upon the pseudo-random number. The method may further include transmitting the session identifier to the first user device.

In some embodiments, the method may further include generating, by the computing device, a data seed based on the pseudo-random number, wherein the session identifier comprises the generated data seed. In some other embodiments, the session identifier may include the pseudo-random number. In some still other embodiments, the method may include transmitting the session identifier to an external device.

In some embodiments, obtaining the first value, includes querying, by the computing device, a server parameter dataset storing one or more previously acquired server parameters of the computing device. Similarly, obtaining the second value includes querying, by the computing device, the server parameter dataset storing one or more parameters of the computing device to identify a value corresponding to the identified second, wherein the second value comprises the identified value.

In such an embodiment, obtaining the second value may include generating a value corresponding to the identified second parameter in response to identification of the second parameter.

Furthermore, while the description above is made with reference to some of the method embodiments described herein, the present disclosure contemplates that the corresponding functionality may be equally found in or performed by the computer-readable storage memory or apparatus.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. Some embodiments of the present disclosure may include fewer or more components than shown in the figures.

DETAILED DESCRIPTION

Figure 1:
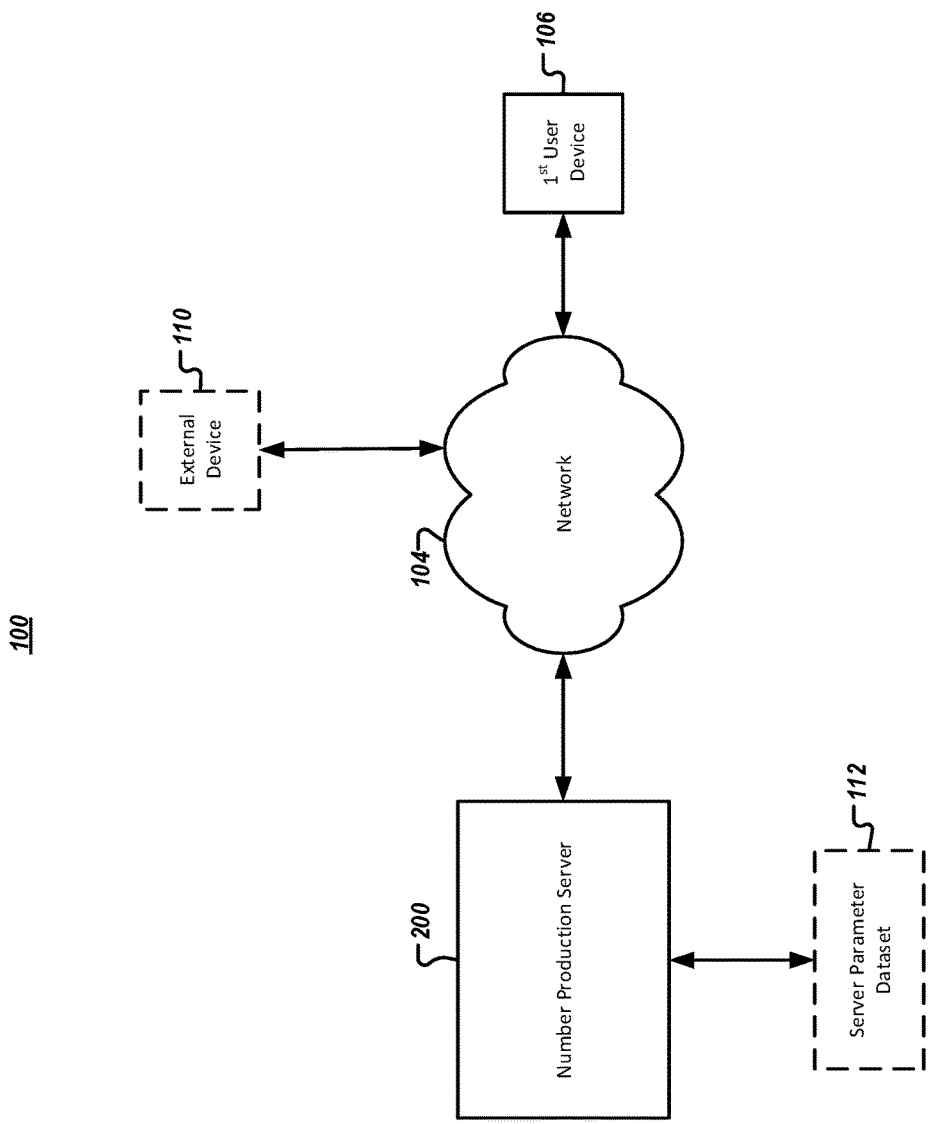
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a number production server as an example "apparatus." However, elements of the apparatus described herein may be equally applicable to the claimed method and computer program product. Thus, use of any such terms should not be taken to limit the spirit and scope of embodiments of the present invention.

Overview

As noted above, methods, apparatuses, systems, and computer program products are described herein that provide solutions to the problems identified above, as well as to others. In one embodiment, a computing device (e.g., number production server 200) may receive a request for a pseudo-random number. The computing device may, by extraction circuitry, select a first parameter (e.g., processor core temperature, processor core voltage, DRAM temperature, DRAM voltage, system temperature, system voltage, fan speed, processor speed, processor core usage percentage, memory usage percentage, cache usage percentage, or the like) from a server parameter dataset. The computing device may then obtain a first value for the first parameter. The extraction circuitry may also select a second parameter (e.g., another server parameter) and may obtain a second value for the second parameter. The computing device may, by transformation circuitry, generate the pseudo-random number based on the first value and the second value. This pseudo-random number may thereafter be used in a variety of different ways. For instance, it may be used for generation of a unique session identifier for a communication session between computing devices. As another example, the pseudo-random number may be used as the seed for still further data transformations in support of a variety of operations in gaming devices, statistics, cryptography, or the like.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "first user device," "mobile device," "electronic device" and the like refer to computer hardware that is configured (either physically or by the execution of software) to access one or more services made available by the number production server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the external device via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the number production server 200 or other computing device via a network.

As used herein, the terms "user profile" and "first user profile" may refer to a collection of settings, configurations, identifiers, data, and information associated with a specific user. A user profile configured in accordance with the present invention may be accessible by one or more of software applications that are supported by the computing device (e.g., number production server 200 in FIG. 1) or other external server or computing device (e.g., associated with a corporation, banking entity, or other $3^{rd}$ party) and, thus, may include application-specific preferences, settings, configurations, data, and information.

As used herein, the term "external device" refers to any object, device, or system which may be in network communication with the user device. For example, an external device may be an external server or computing device (e.g., associated with a corporation, banking entity, or other $3^{rd}$ party) that may request, receive, and/or provide data to or from one of the devices described above. By way of a more particular example, an external device may include a server of a bank, online vendor, or the like configured to be located in secure communication with the user device via an authenticated session (e.g., via the pseudo-random number techniques described herein).

As used herein, the term "server parameter dataset" refers to a data structure or repository for storing information regarding server parameters that may be dynamically retrieved by a computing device. By way of example, the server parameter dataset may identify server parameters that have independent characteristics (i.e., no server parameter is derivable solely from another server parameter). Moreover, the server parameter dataset may, in some embodiments, identify server parameters, while in other embodiments the server parameter dataset may identify server parameters and also store server parameter values corresponding to one or more of the identified server parameters. For instance, one example server parameter may be a processor core usage percentage parameter, and a value for this server parameter may be retrieved by a computing device (e.g., number production server, external device, user device, or the like) from an internal diagnostics system of the computing device. If a processor core usage percentage parameter value is retrieved periodically or at predefined times, then the server parameter dataset may store the retrieved processor core usage percentage parameter values in connection with the times at which they are retrieved. Alternatively, the processor core usage percentage parameter value may simply be retrieved in near-real-time (e.g., at a time at which a request for the pseudo-random number was received by the computing device), or in real-time (e.g., at the time at which the processor core usage percentage parameter is selected for use in pseudo-number generation), in which case the server parameter dataset may never actually store any values for the processor core usage percentage parameter at all. Of course, this example is intended for descriptive purposes only and it will be appreciated that the server parameter dataset may comprise a repository identifying any number of server parameters beyond the processor core usage percentage parameter. Furthermore, as described hereafter, in some embodiments the server parameter dataset may be a component of the number production server 200. In this way, the server parameters user to generate a pseudo-random number for use as a session identifier in authentication a session are known only to the number production server 200.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., a number production server 200) communicably connected via a network 104 to a user device 106 and, in some embodiments, an external device 110. The example system 100 may also include a server parameter dataset 112 that may be hosted by the number production server 200 or by one or more other devices in communication with the number production server 200 (e.g., separate devices within a secured intranet associated with the number production server 200).

The number production server 200 may include circuitry, networked processors, or the like configured to perform some or all of the apparatus-based (e.g., number production server-based) processes described herein, and may be any suitable network server and/or other type of processing device. In this regard, the number production server may be embodied by any of a variety of devices. For example, the number production server 200 may be configured to receive input data (e.g., server parameter data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection therewith. In some embodiments, the number production server 200 may be located remotely from the user device 106, external device 110, and server parameter dataset 112, although in other embodiments, the number production server 200 may comprise the user device 106, external device 110, and/or server parameter dataset 112. The number production server 200 may, in some embodiments, comprise several servers or computing devices performing interconnected and/or distributed functions. Despite the many arrangements contemplated herein, the number production server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The user device 106 may be associated with a first user and first user profile. Although a single user device associated with a corresponding user profile is shown, the example system 100 may include any number of user devices that may be associated with various users and/or user profiles. The user device 106 may be a cellular telephone (e.g., a smartphone and/or other type of mobile telephone), laptop, tablet, electronic reader, e-book device, media device, wearable, smart glasses, smartwatch, or any combination of the above.

The external device 110, as defined above, may be associated with any entity that is not associated with the user device 106. By way of a more particular example, the external device 110 may include a server of a bank, online vendor, or other 3'-party configured to be in secure communication with the user device 106 via the network 104 (e.g., an authenticated session). Although shown as a single external device 110, the system 100 may include any number of external devices.

In some embodiments, the user device 106 may be configured to request a pseudo-random number (e.g., from the number production server 200). The user device 106 may also allow a user to provide input which may be conveyed to the number production server 200 via the network 104 as input data. Input data may be generated via one or more input devices including, without limitation, a touchscreen, microphone, camera, optical scanner, fingerprint reader, and/or motion sensor device (e.g., an accelerometer, gyroscope, etc.).

The server parameter dataset 112 may be stored by any suitable storage device configured to store some or all of the information described herein (e.g., memory 204 of the number production server 200 or a separate memory system separate from the number production server 200, such as one or more database systems, backend data servers, network databases, cloud storage devices, or the like provided by an external device 110 (e.g., a banking entity or $3^{rd}$ party provider) or the user device 106). The server parameter dataset 112 may comprises data received from the number production server 200 (e.g., via a memory 204 and/or processor(s) 202) or the user device 106, and the corresponding storage device may thus store this data.

Figure 2:
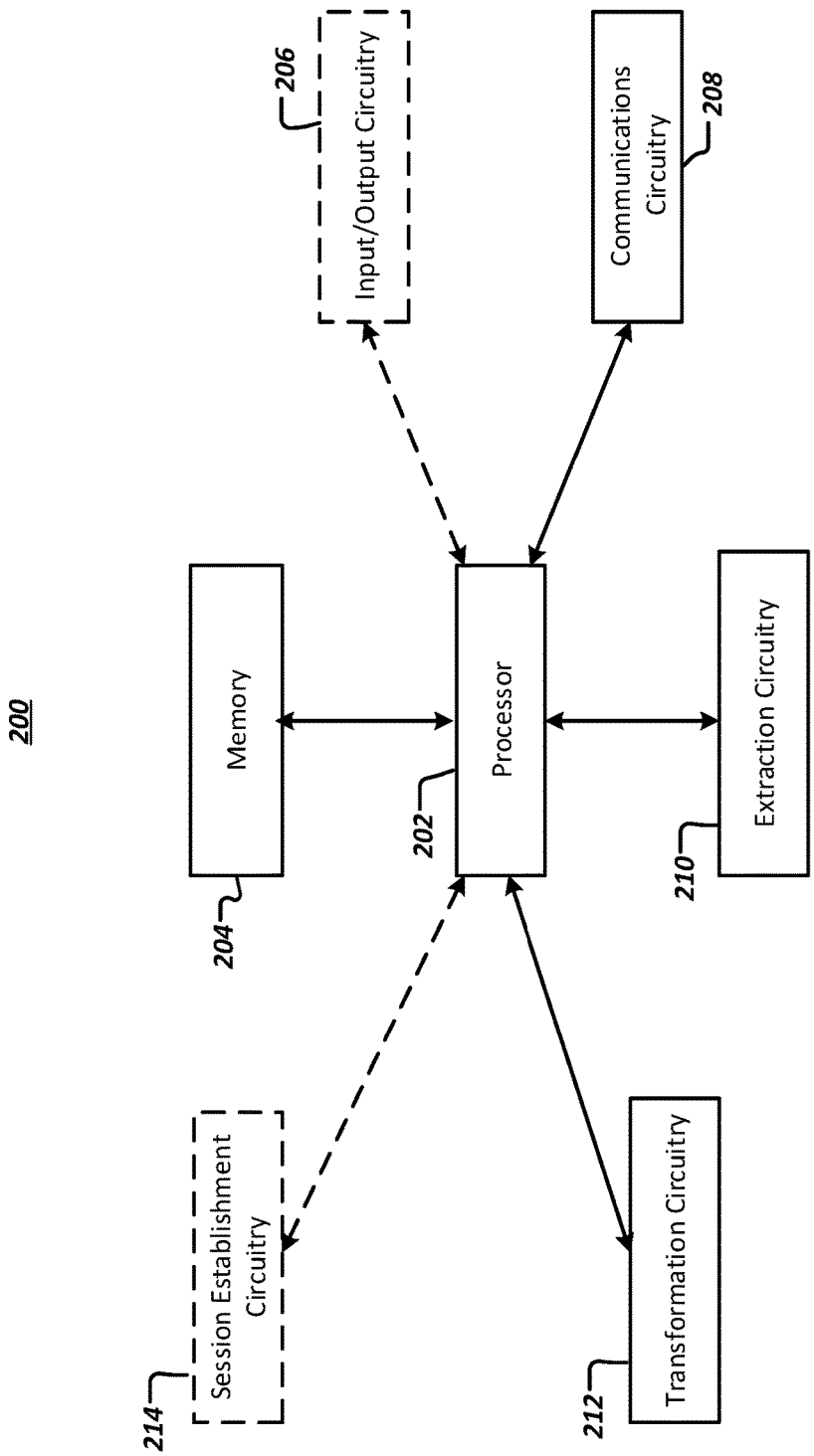
FIG. 2 illustrates a schematic block diagram of example circuitry that may perform various operations, in accordance with some example embodiments described herein.

As illustrated in FIG. 2, the number production server 200 may include a processor 202, a memory 204, input/output circuitry 206, and communications circuitry 208. Moreover, number production server 200 may include extraction circuitry 210, transformation circuitry 212, and, in some embodiments, session establishment circuitry 214. The number production server 200 may be configured to execute the operations described below in connection with FIGS. 3-5. Although components 202-214 are described in some cases using functional language, it should be understood that the particular implementations necessarily include the use of particular hardware. It should also be understood that certain of these components 202-214 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the number production server 200 may be housed within one or more of the first user device 106 or the external device 110. As indicated previously, it will be understood in this regard that some of the components described in connection with the number production server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the number production server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the number production server. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the number production server to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the number production server, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The number production server 200 may further include input/output circuitry 206 that may, in turn, be in communication with processor 202 to provide output to a user and to receive input from a user, user device, or another source (e.g., so as receive server parameter data). In this regard, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like). It will be understood that while some embodiments described herein may utilize a number production server 200 that employs input/output circuitry 206, this is an optional component insofar as some other embodiments may utilize a number production server 200 that does not itself have any user-facing interactions and thus may not include input/output circuitry 206.

The communications circuitry 208 may be any means such as a device or circuitry embodied in either hardware or a combination of hardware and software that is configured to receive and/or transmit data from/to a network and/or any other device, circuitry, or module in communication with the number production server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the number production server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Extraction circuitry 210 includes hardware components designed to select a first parameter from a server parameter dataset and to select a second parameter from the server parameter dataset. The extraction circuitry 210 may further include hardware components designed to perform pseudo-random selection of the first parameter and/or second parameter. These hardware components may, for instance, utilize elements of processor 202 or memory 204 to pseudo-randomly select server parameters of the number production server 200 (e.g., processor core usage percentage and DRAM voltage) from a dataset corresponding to a plurality of potential server parameters of the number production server (e.g., processor core temperature, processor core voltage, DRAM temperature, DRAM voltage, system temperature, system voltage, fan speed, processor speed, processor core usage percentage, memory usage percentage, cache usage percentage, or the like). Extraction circuitry 210 may utilize processing circuitry, such as the processor 202, to perform its corresponding operations, and may utilize memory 204 to store collected information. By virtue of the nature of the server parameters, the server parameter data obtained by the extraction circuitry may be received in binary form and may need no further transformation to facilitate its subsequent transformation or convolution. However, the present disclosure contemplates that the extraction circuitry 210 may include any necessary components or related circuitry, if needed, to place the obtained values for the selected server parameters in an appropriate form for transformation or convolution.

Transformation circuitry 212 includes hardware components designed to transform or convolute a first value (corresponding to a first server parameter) with a second value (corresponding to a second server parameter) to generate a pseudo-random number. Transformation circuitry 212 may utilize processing circuitry, such as the processor 202, to perform its corresponding operations, and may utilize memory 204 to store collected information.

Session establishment circuitry 214 includes hardware components designed to establish an authenticated session between the number production server 200, the user device 106, and/or the external device 110. For example, the session establishment circuitry 214 may, in some embodiments, identify a need for a pseudo-random number in response to receiving a request for some other purpose (e.g., a request for authentication by a user device 106) and may generate a session identifier based upon a generated pseudo-random number. Session establishment circuitry 214 may utilize processing circuitry, such as the processor 202, to perform its corresponding operations, and may utilize memory 204 to store collected information. It will be understood that session establishment circuitry 214 is optional insofar as some embodiments may not utilize a pseudo-random number in the context of session authentication and may utilize a generated pseudo-random number for other purposes, and such embodiments may thus have no need for session establishment circuitry 214.

It should also be appreciated that, in some embodiments, the extraction circuitry 210, transformation circuitry 212, or session establishment circuitry 214 may include a separate processor, specially configured field programmable gate array (FPGA), or application specific interface circuit (ASIC) to perform its corresponding functions.

In addition, computer program instructions and/or other type of code may be loaded onto a computer, processor or other programmable number production server's circuitry to produce a machine, such that the computer, processor other programmable circuitry that execute the code on the machine create the means for implementing the various functions, including those described in connection with the components of number production server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Generating a
Pseudo-Random Number

Figure 3:
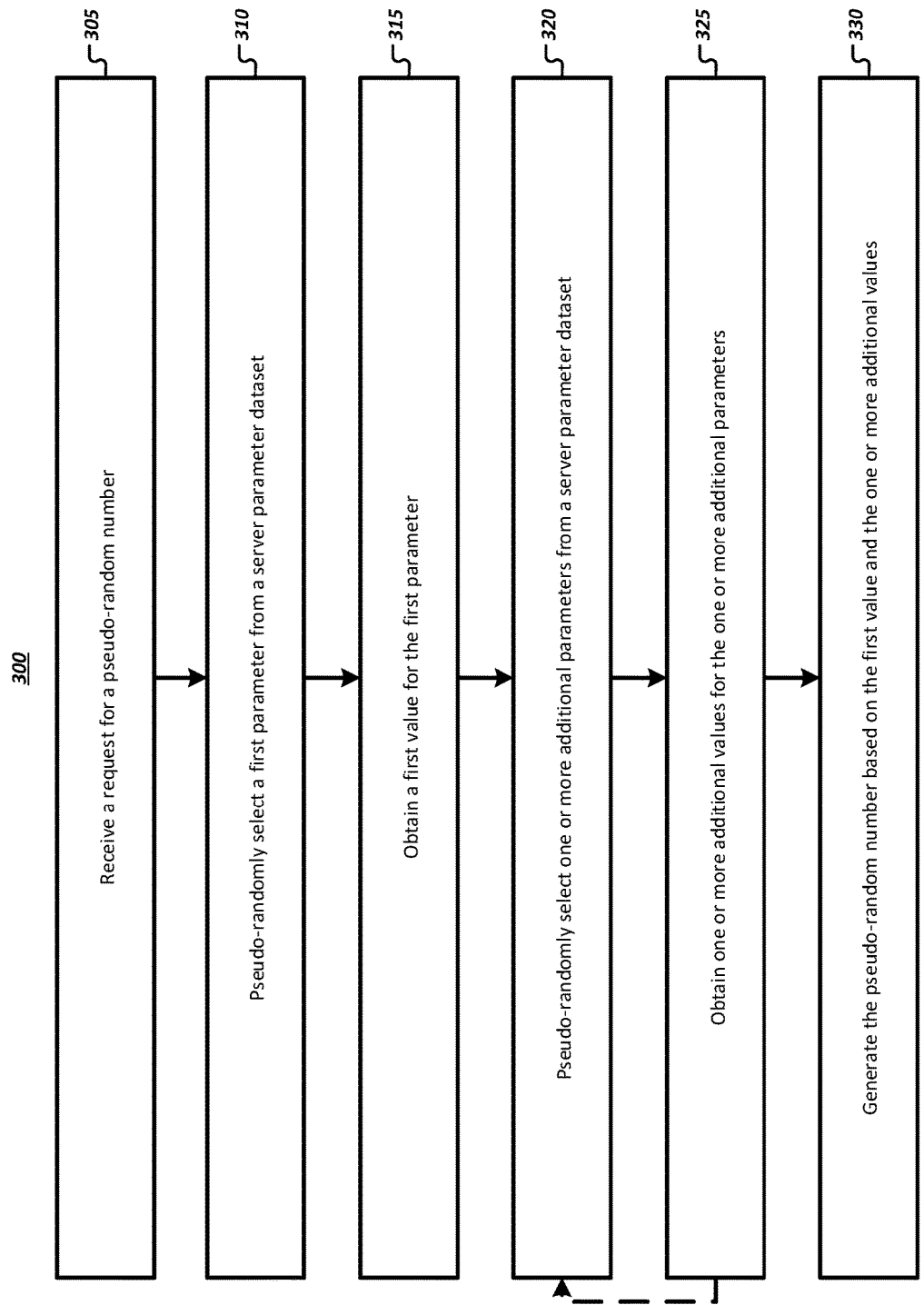
FIG. 3 illustrates an example flowchart for pseudo-random number generation, in accordance with some example embodiments described herein.

FIG. 3 illustrates a flowchart containing a series of operations for generation of a pseudo-random number. The operations illustrated in FIG. 3 may, for example, be performed by, with the assistance of, and/or under the control of an apparatus (e.g., number production server 200), as described above. In this regard, performance of the operations may invoke one or more of processor 202, memory 204, input/output circuitry 206, communications circuitry 208, extraction circuitry 210, transformation circuitry 212, or session establishment circuitry 214.

As shown in operation 305, the apparatus (e.g., number production server 200) includes means, such as input/output circuitry 206, communications circuitry 208, or the like, for receiving a request for a pseudo-random number. In some example embodiments, as described above and more fully with reference to FIG. 4 below, the communications circuitry 208 may receive a request for a pseudo-random number or an instruction to generate a pseudo-random number from a user device 106 and/or an external device 110. By way of example, the user device 106 may request an authorized session with the external device 110, and may request a pseudo-random number from the number production server 200 to authorize the session (e.g., serve as a session identifier). Similarly, in some embodiments, the user device 106 may receive a request for a session from an external device 110, and may request a pseudo-random number from the number production server 200 for use in authorizing the session. In some other embodiments, the input/output circuitry 206 of the number production server 200 may receive a request (e.g., via a direct user input or automatically) for a pseudo-random number without input from the user device 106 or external device 110. For instance, the input/output circuitry 206 may receive the request for a pseudo-random number from direct user interaction with the number production server 200, or the session establishment circuitry 214 may trigger the request for the pseudo-random number in an instance in which the number production server 200 requires a pseudo-random number to complete an internal process (such as generating a session identifier that requires a pseudo-random number).

Thereafter, as shown in operation 310, the apparatus (e.g., number production server 200) includes means, such as extraction circuitry 210 or the like, for pseudo-randomly selecting a first parameter from a server parameter dataset 112. In some example embodiments, the extraction circuitry 210 may be configured to pseudo-randomly select the first parameter from a plurality of parameters identified by the server parameter dataset 112. By way of example, the extraction circuitry 210 may identify various possible server parameters including but not limited to a processor core temperature, processor core voltage, DRAM temperature, DRAM voltage, system temperature, system voltage, fan speed, processor speed, processor core usage percentage, memory usage percentage, cache usage percentage, or the like from a server parameter dataset. The manner by which the extraction circuitry 210 may pseudo-randomly select a particular parameter as the first parameter to be obtained is described hereafter.

This selection at operation 310 may be pseudo-random in that the number production server 200 may utilize a pseudo-random selection technique to reduce the likelihood that the selection of the first parameter could be reproduced by a perpetrator. By way of example, in some embodiments, once a first parameter is selected, a selection frequency for each server parameter may be monitored such that the likelihood that an unselected parameter is selected on subsequent selections at operation 310 is increased until the unselected parameter is selected as the first parameter. As an example, in an instance in which the number production server's processor core usage percentage server parameter is initially selected as the first parameter at operation 310, the remaining server parameters such as processor core temperature, processor core voltage, DRAM temperature, etc., may be weighted such that selection of these server parameters on subsequent selections of the first parameter is more likely as compared to the processor core usage percentage. Once these remaining server parameters are selected as the first parameter, their corresponding weighting may decrease relative to other unselected parameters. To duplicate this pseudo-random process, an intruder would need to have insight into multiple different iterations of the pseudo-random number generation process, and even then would need to deduce the weighting scheme. While a frequency calculation procedure is outlined above, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the first parameter without departing from the scope of the disclosure.

Thereafter, as shown in operation 315, the apparatus (e.g., number production server 200) includes means, such as processor 202, memory 204, input/output circuitry 206, communications circuitry 208, extraction circuitry 210, or the like, for obtaining a first value for the first parameter. In some example embodiments, as described in greater detail below in connection with FIG. 5, obtaining the first value includes querying, by the communications circuitry, a remotely stored server parameter dataset storing one or more previously acquired server parameters of the number production server 200. In other embodiments where the server parameter dataset is not stored remotely, this operation may request this first value from a memory (e.g., memory 204) locally storing the server parameter dataset. In other embodiments, obtaining the first value includes generating, by extraction circuitry 210 of the number production server 200, a particular server parameter value at a time at which the request for the pseudo-random number was received by the number production server. For example, if the extraction circuitry 210 selects the processor core usage percentage as the first parameter, the extraction circuitry 210 may record the processor core usage percentage at that instance in time. While in some embodiments the number production server 200 comprises the first user device 106, as described above, this operation may be more secure in an instance in which the server parameters and associated server parameter dataset is unknown to the user device 106 or the external device 110. Said differently, the number production server may be deemed more secure due to its location behind one or more firewalls, digital and/or physical barriers, (e.g., such as when the number production server 200 is housed by a banking entity) instead of being a component of the first user device 106.

Thereafter, as shown in operation 320, the apparatus (e.g., number production server 200) includes means, such as processor 202, memory 204, input/output circuitry 206, communications circuitry 208, extraction circuitry 210, or the like, for pseudo-randomly selecting a second parameter or more additional parameters. In some example embodiments, the extraction circuitry 210 may be configured to pseudo-randomly identify a plurality of server parameters from the server parameter dataset 112 to select a second parameter to be obtained. Selection of a second or subsequent server parameter may be performed in various ways similar to those described in reference to pseudo-randomly selecting the first parameter at operation 310.

This selection at operation 320 may be pseudo-random in that the number production server 200 may utilize pseudo-random selection techniques to ensure that the selection of the second parameter may not be determined or imitated by a perpetrator. The procedure used to pseudo-randomly select this second parameter may parallel the procedure used in selection of the first parameter at operation 310. For instance, in some embodiments, once a second parameter is selected, a selection frequency for each server parameter may be monitored such that the likelihood that an unselected parameter is selected on subsequent selections at operation 320 is increased until the unselected parameter is selected as the second parameter. Said differently, in an instance in which DRAM temperature of the number production server 200 is selected as the second parameter to at operation 320, the remaining server parameters (e.g., system temperature, system voltage, fan speed, etc.) may be weighted such that selection of these server parameters on subsequent selections of the second parameter are more likely than a subsequent selection of DRAM temperature. Once these remaining server parameters are selected as the second parameter, their corresponding weighting may decrease relative to other unselected parameters. In this way, the extraction circuitry may pseudo-randomly select the second parameter. While described in reference to a frequency calculation, the present disclosure contemplates that any known pseudo-random number generation algorithm (e.g., a middle-square method, mersenne twister, inversive congruential generator, lagged Fibonacci generator, linear feedback shift register or the like) may be used to pseudo-randomly select the second parameter without departing from the scope of the disclosure. In addition, it will be understood that selection of the second parameter may be informed by the first selected parameter, such that the same server parameter is not selected in both cases.

Thereafter, as shown in operation 325, the apparatus (e.g., number production server 200) includes means, such as processor 202, memory 204, input/output circuitry 206, communications circuitry 208, or the like, for obtaining a second value for the second parameter or one or more additional values for the one or more additional parameters. In some example embodiments, as described in greater detail below in connection with FIG. 5, obtaining the second value includes querying, by the communications circuitry 208, a server parameter dataset storing one or more previously acquired server parameters of the number production server 200. In other embodiments, obtaining the second value includes generating a selected server parameter at a time in which the request for a pseudo-random number was received by the number production server 200. For example, in an instance in which the DRAM temperature is the selected second parameter, the number production server 200 may record the DRAM temperature at that instance in time. As shown in FIG. 3, in some embodiments, additional server parameters may be utilized to generate the pseudo-random number. In such embodiments, the procedure may return from operation 325 to operation 320 for selection of an additional server parameter (and retrieval of a corresponding parameter value). This loop may occur any number of times such that the pseudo-random number is generated based on at least two server parameter values, but in theory may further be based in part on any number of additional server parameter values as well.

Thereafter, as shown in operation 330, the apparatus (e.g., number production server 200) includes means, such as transformation circuitry 212 or the like, for generating the pseudo-random number based on the first value and the second value (and any additional values generated through repetition of operations 320 and 325). In some embodiments, generation of the pseudo-random number may be performed by transforming or convoluting the first value by the second value. As described above with reference to operations 315 and 325 above, and described further in FIG. 5 below, the first value for the first parameter and the second value for the second parameter may comprise two pseudo-randomly selected numerical values. To transform or convolute the first value by the second value to generate the pseudo-random number, the transformation circuitry 212 and/or processor 202 may perform any mathematical transformation based on the numerical values. For example, the transformation may, in some embodiments, comprise a multiplication of the first value and the second value to generate the pseudo random number. Similarly, the transformation or convolution may, in some embodiments, comprise an exponential function such that the first value is raised to the power of the second value. The present disclosure contemplates that any number of mathematical operations and combinations of mathematical operations (e.g., multiplication followed by an exponential function) may be used to transform or convolute the first value by the second value to generate pseudo-random numbers of near-infinite scope and degree.

With continued reference to operation 330, in some embodiments, the transformation circuitry 212 and/or processor 202 may perform a mathematical convolution to generate the pseudo random number. As would be evident to one of ordinary skill in the art in light of the present disclosure, mathematical convolution refers to a mathematical operation performed on two functions (e.g., the first value and the second value) to produce a third function (e.g., the pseudo-random number) that is a modified version of one of the original functions, giving the integral of the pointwise multiplication of the two functions as a function of the amount that one of the original functions is translated. Thus, because of the many different mathematical transformations that might be performed by the transformation circuitry, the transformation described in operation 330 may in theory be used to generate pseudo-random numbers of near-infinite scope and degree such that the possibility of determining the pseudo-random numbers by a perpetrator is greatly reduced or substantially impossible.

As alluded to above, while the transformation or convolution described herein references a first value and a second value obtained from the first parameter and second parameter, respectively, the present disclosure contemplates that any number of server parameters and associated values may be used. For example, the number production server 200 may select a third parameter from the server parameter dataset 112 and a fourth parameter from the server parameter dataset 112 by a similar method as described above with reference to operations 310 and 320. The number production server 200 may then obtain a third value for the third parameter and a fourth value for the fourth parameter by a similar method as described with reference to operations 315 and 325. The number production server 200 may also perform any mathematical transformation based on the numerical first, second, third, and fourth values, or any combination thereof. For example, the transformation may, in some embodiments, comprise a multiplication of the first value, the second value, and the third value, and a division of the resultant value by the fourth value to generate the pseudo-random number.

Figure 4:
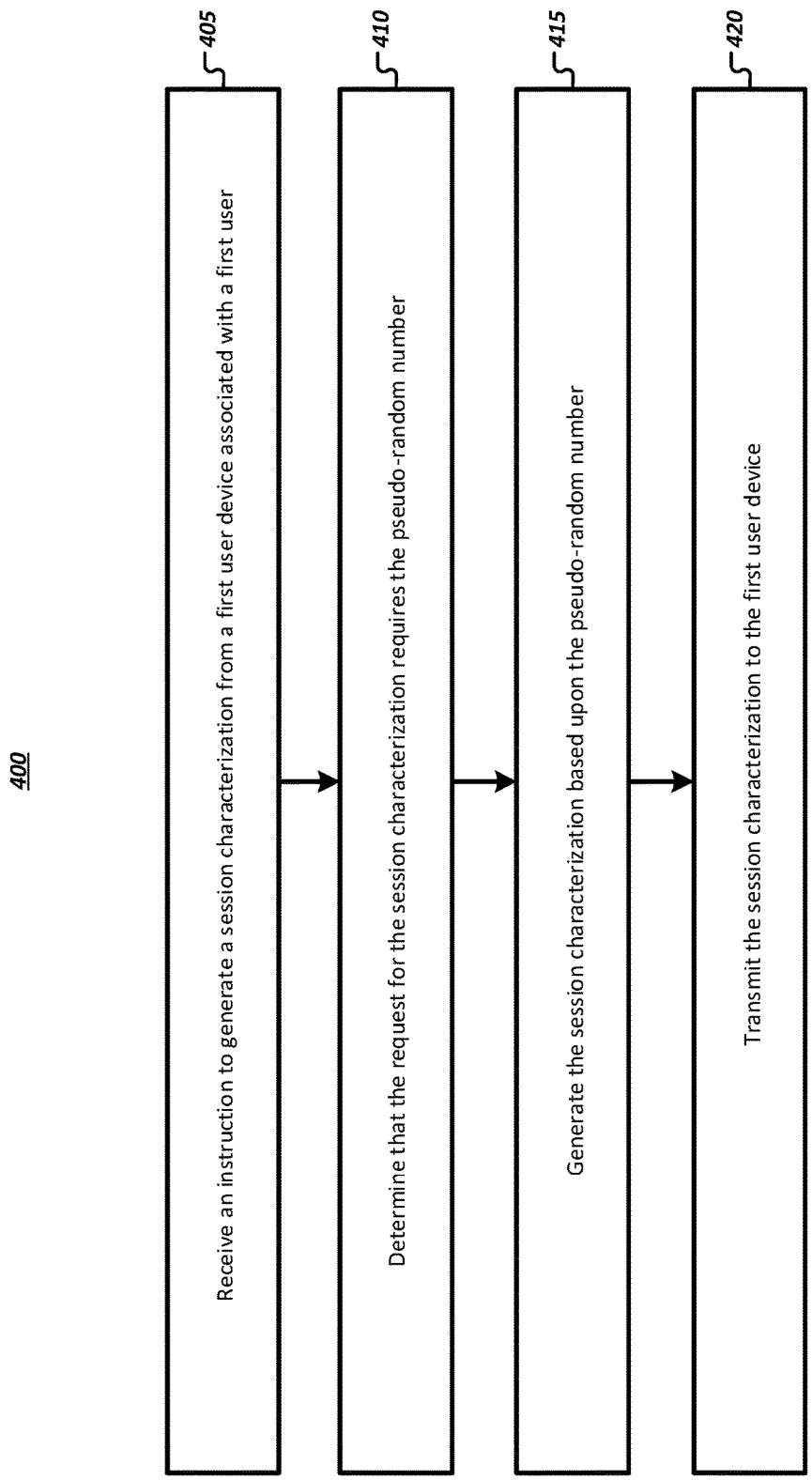
FIG. 4 illustrates an example flowchart for session authentication based on a generated pseudo-random number, in accordance with some example embodiments described herein.

Turning next to FIG. 4, a flowchart is shown that describes example embodiments for authentication based on the pseudo-random number of FIG. 3. The operations illustrated in FIG. 4 may, for example, be performed by, with the assistance of, and/or under the control of an apparatus (e.g., number production server 200), as described above. In this regard, performance of the operations may invoke one or more of processor 202, memory 204, input/output circuitry 206, communications circuitry 208, extraction circuitry 210, transformation circuitry 212, or session establishment circuitry 214.

In operation 405, the apparatus 100 may further include means, such as the input/output circuitry 206, communications circuitry 208, session establishment circuitry 214, or the like for receiving an instruction to generate a session identifier from a first user device associated with a first user. As described in general above, in some embodiments, the user device 106 may transmit an instruction to the number production server 200 to generate a pseudo-random number. By way of example, a first user device may be communicably connected to an external device 110 (e.g., an online vendor or banking entity) and may, due to the circumstances surrounding the connection (e.g., purchasing an item, performing a wire transfer, or the like), may request an authenticated session requiring a pseudo-random number. This request may be transmitted by the user device 106 as a results of a user input, but, in many cases, the user device 106 may automatically transmit a request for a pseudo-random number (e.g., an initial connection to the online vendor's website, logging into an online bank account, etc.). In embodiments where the request is transmitted by the user device 106, contextual information regarding the request may be included in the request itself to facilitate generation of an appropriately secure session identifier. This contextual information may identify the counterparty for which a session will be created, an ostensible purpose of the session identifier (e.g., purchasing an item, performing a wire transfer, or the like), or the amount and type of private information (e.g., credit card numbers, social security numbers, bank account information, personally identifying information, or the like) that may be transmitted via the session.

Thereafter, as shown in operation 410, the apparatus (e.g., number production server 200) includes means, such as processor 202, memory 204, communications circuitry 208, session establishment circuitry 214, or the like, for determining that the request for the session identifier requires the pseudo-random number. This determination may be performed by the number production server 200, and associated circuitry components, based upon the instructions from the first user device at operation 405. For example, the request from the first user device 106 may indicate that a pseudo-random number is necessary to serve as a session identifier to authenticate a session. Alternatively, this determination may be made by the number production server 200 itself via involvement of the session establishment circuitry 214.

In this regard, the session establishment circuitry 214 may evaluate the received session identifier request and may determine from included contextual information a required security level for the requested session identifier. For instance, if the session will be for a monetary transaction or will be used to transmit private information, then the session establishment circuitry 214 may determine that a pseudo-random number is required. Moreover, based on the significance of the economic transaction or the volume and/or sensitivity of the private information, the establishment circuitry 214 may determine the number of distinct server parameters to utilize in generation of the pseudo-random number (e.g., two server parameters may be sufficient for an economic transaction with an aggregate value up to $100, whereas three server parameters would be required for an economic transaction with an aggregate value from $101 to $1,000, whereas four server parameters are required for a transaction with an aggregate value from $1,001 to $10,000, and so forth; as another example, a typical retail transaction utilizing a credit card may require only two server parameters, whereas a wire transfer may require at least four server parameters, regardless of the monetary value of the transactions; as another example, when only a single type of private information is transmitted, two server parameters may be sufficient, whereas when multiple types of private information (or values for multiple individuals) are required additional server parameters may be required in a stepped fashion based on predetermined thresholds of type and/or volume of private information that will be transmitted).

With reference to operation 415, the apparatus (e.g., number production server 200) includes means, such as processor 202, memory 204, session establishment circuitry 214, or the like, for generating a session identifier based upon the pseudo-random number (e.g., generated by the operations of FIG. 3). In some embodiments, the the session identifier comprises the generated pseudo-random number. In such an embodiment, the resultant pseudo-random number (e.g., as generated by the operations of FIG. 3) may by transmitted by the number production server 200 to one or more of the user device 106 or the external device 110 as described in operation 420 below. In other embodiments, the pseudo-random number generated by the operations of FIG. 3 may be used as a data seed based for use in further pseudo-random number operations. For example, the generated pseudo-random number may be used to seed a linear congruential generator (e.g., or other equivalent pseudo-random number generation algorithms) to further complicate the process of replicating the session identifier. It will be understood that any other pseudo-random number generation algorithm (e.g., a middle-square method, mersenne twister, inversive congruential generator, lagged Fibonacci generator, linear feedback shift register or the like) may be used for this purpose without departing from the scope of the disclosure.

Thereafter, as shown in operation 420, the apparatus (e.g., number production server 200) includes means, such as communications circuitry 208 or the like, for transmitting the session identifier to the first user device 106. As described above with reference to authenticating a session, the communications circuitry 208 may transmit the session identifier (based upon the pseudo-random number) to the first user device 106 to authenticate a session.

Figure 5:
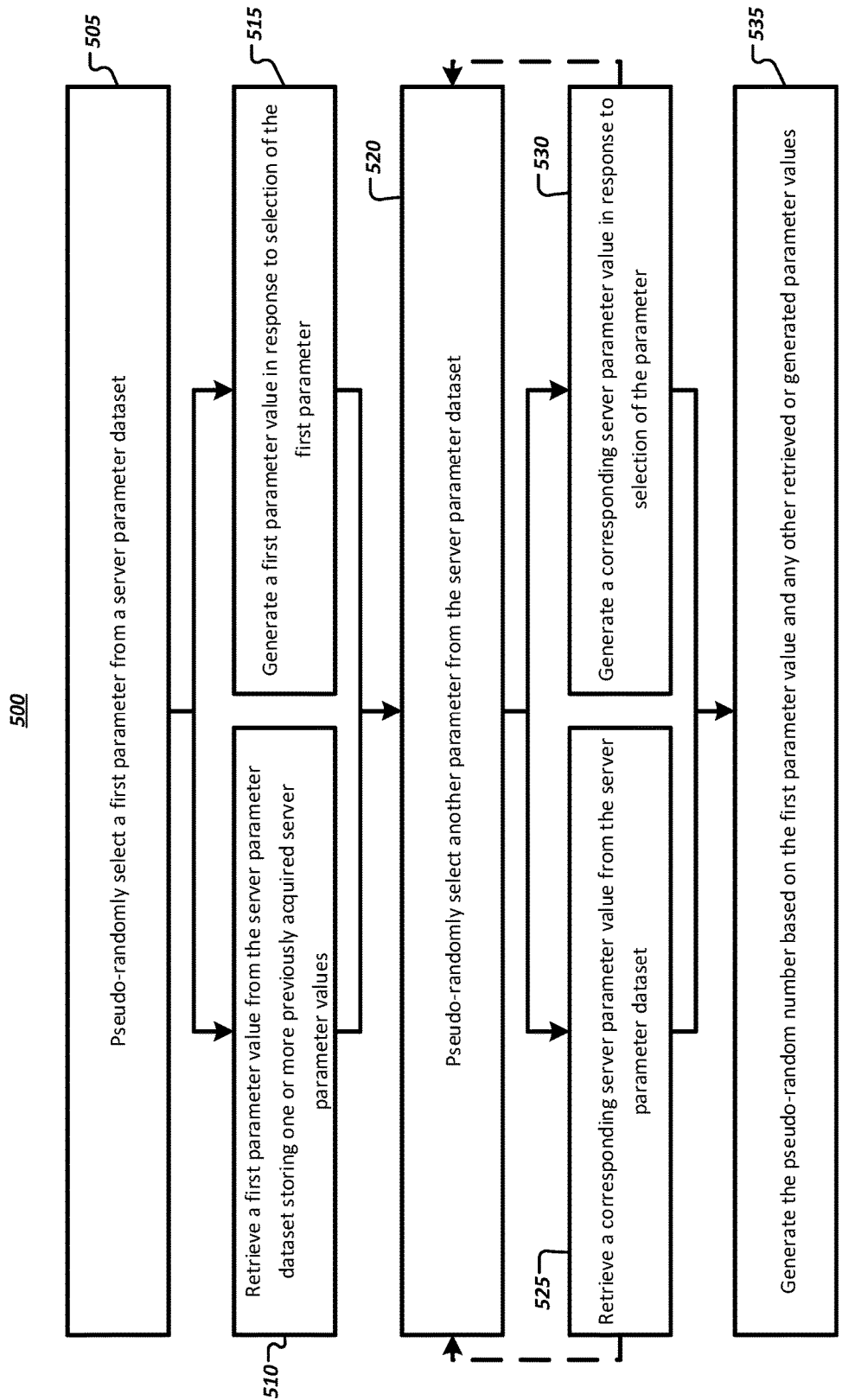
FIG. 5 illustrates an example flowchart for obtaining a first value corresponding to a first parameter and one or more additional values corresponding to one or more additional parameters selected from a server parameter dataset, in accordance with some example embodiments described herein.

Turning next to FIG. 5, a flowchart is shown that describes example embodiments for obtaining a first value corresponding to a first parameter and a second value corresponding to the second parameter. The operations illustrated in FIG. 5 may, for example, be performed by, with the assistance of, and/or under the control of an apparatus (e.g., number production server 200), as described above. In this regard, performance of the operations may invoke one or more of processor 202, memory 204, input/output circuitry 206, communications circuitry 208, extraction circuitry 210, transformation circuitry 212, or session establishment circuitry 214.

As shown in operation 505, the apparatus 100 may further include means, such as the extraction circuitry 210 or the like for pseudo-randomly selecting a first parameter from a server parameter dataset. As described in reference above in reference to operation 310 in FIG. 3, the extraction circuitry 210 may be configured to pseudo-randomly identify a plurality of parameters from the server parameter dataset 112 and select a first parameter to be obtained. By way of example, the extraction circuitry 210 may identify various possible server parameters including but not limited to a processor core temperature, processor core voltage, DRAM temperature, DRAM voltage, system temperature, system voltage, fan speed, processor speed, processor core usage percentage, memory usage percentage, cache usage percentage, or the like from a server parameter dataset. The extraction circuitry 210 may, for example, pseudo-randomly select a processor core usage percentage as the first parameter to be obtained.

Thereafter, as shown in operations 510 and 515, the apparatus (e.g., number production server 200) includes means, such as memory 204, communications circuitry 208, extraction circuitry 210, or the like, for obtaining a first value for the first parameter. As shown in operation 510, this first value may be retrieved from the server parameter dataset (hosted, for instance, by memory 204 or by a separate device with which the number production server 200 is in communication via communications circuitry 208) storing one or more previously acquired server parameters of the number production server 200. As shown in operation 515, this first value may also be obtained by generating, by extraction circuitry 210, a first parameter value in response to selection of the first parameter. To facilitate performance of operation 510, the number production server 200 may have previously periodically or at predetermined points in time recorded various server parameters such that those server parameters values are available for retrieval from the server parameter dataset.

With regard to operation 515, the number production server 200 may generate, by extraction circuitry 210, a first parameter value in response to selection of the first parameter at a time at which the request for the pseudo-random number was received by the number production server. For example, in an instance in which the processor core usage percentage is the selected first parameter, the number production server 200 may record the processor core usage percentage (e.g., at the time that this selection is made).

As shown in operation 520, the apparatus 100 may further include means, such as the extraction circuitry 210 or the like for pseudo-randomly selecting another parameter from the server parameter dataset. As described in reference above in reference to operation 320 in FIG. 3, the extraction circuitry 210 may be configured to pseudo-randomly identify a plurality of parameters from the server parameter dataset 112 and select one or more other parameters to be obtained. By way of example, the extraction circuitry 210 may identify various possible server parameters including but not limited to a processor core temperature, processor core voltage, DRAM temperature, DRAM voltage, system temperature, system voltage, fan speed, processor speed, processor core usage percentage, memory usage percentage, cache usage percentage, or the like from a server parameter dataset. The extraction circuitry 210 may, for example, pseudo-randomly select a DRAM temperature as the second parameter to be obtained.

Thereafter, as shown in operations 525 and 530, the apparatus (e.g., number production server 200) includes means, such as communications circuitry 208, extraction circuitry 210, or the like, for retrieving a corresponding server parameter value from the server parameter dataset or by generating a corresponding server parameter value in response to selection of the parameter, respectively. Performance of these operations parallels performance of operations 510 and 515, described above. In this regard, with regard to operation 525, the communications circuitry 208 may query a server parameter dataset storing various server parameters of the number production server 200 to retrieve a first parameter value. As described above with reference to operation 510, in some embodiments, the number production server 200 may periodically record various server parameters and/or periodically retrieve said parameters from an internal diagnostics system or other storage (e.g., memory 204) of the number production server 200.

With regard to operation 530, the number production server 200 may generate, by extraction circuitry 210, a first parameter value in response to selection of the first parameter. For example, in an instance in which the DRAM temperature is the selected second parameter, the number production server 200 may record the DRAM temperature (e.g., the time this selection is made). Thereafter, as shown in operation 535, the apparatus (e.g., number production server 200) includes means, such as processor 202, memory 204, communications circuitry 208, transformation circuitry 212, or the like, for generating the pseudo-random number based on the first parameter value and any other retrieved or generated parameter values. It will be understood that, as described in connection with FIG. 3 above, additional server parameters may also be retrieved as determined by the session establishment circuitry 214, and that generation of the pseudo-random number may perhaps be based on more than two server parameters depending on the level of security required by the eventual use of the pseudo-random number.

As described above, various technical challenges are surmounted via technical solutions contemplated herein. For instance, the transformation, and in particular convolution, of at least two pseudo-randomly-selected server parameters produces a pseudo-random number that is more challenging to replicate than those produced by traditional methods. For instance, to recreate a pseudo-random number generated as described herein, a perpetrator would need to (1) access an independently protected server (e.g., supported or otherwise protected by authenticating entity) to extract each of the server's various operating parameters, (2) select the correct server parameters, and (3) learn the appropriate transformation applied using the steps describe above. And by performing various operations contemplated herein, embodiments of the present disclosure provide improved session authentication techniques by transforming at least one pseudo-random server parameter with another pseudo-random server parameter in order to generate a unique seed for a pseudo-random number used to establish a secure session. By selecting one of various possible server parameters (e.g., processor core temperature, processor core voltage, DRAM temperature, DRAM voltage, system temperature, system voltage, fan speed, processor speed, processor core usage percentage, memory usage percentage, cache usage percentage, or the like) and transforming or convoluting the first server parameter data with another one of various possible server parameters, pseudo-random numbers of near-infinite scope and degree can be generated that are hardened against newer and more powerful malicious attacks that exploit the growing ubiquity of powerful computing resources. In this way, the possibility of determining the pseudo-random numbers by a perpetrator are greatly reduced or made substantially impossible even in the face of an increasingly sophisticated globally networked environment.

FIGS. 3-5 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the number production server 200 and executed by a processor 202 of the number production server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating pseudo-random numbers, the method comprising:
   receiving, by a computing device, an instruction to generate a session identifier from a first user device associated with a first user;
   determining, by session establishment circuitry of the computing device, that the request for the session identifier requires a pseudo-random number;
   selecting, by extraction circuitry of the computing device, a first parameter from a server parameter dataset;
   obtaining a first value for the first parameter;
   selecting, by the extraction circuitry, at least a second parameter from the server parameter dataset;
   obtaining at least a second value for the second parameter;
   generating, by transformation circuitry of the computing device, the pseudo-random number based on the first value and the second value;
   generating, by the session establishment circuitry of the computing device, the session identifier based upon the pseudo-random number; and
   transmitting the session identifier to the first user device.

2. The method according to claim 1, further comprising:
   in response to obtaining the second value for the second parameter, selecting, by the extraction circuitry, a third parameter from the server parameter dataset; and
   obtaining a third value for the third parameter,
   wherein generating the pseudo-random number is further based on the third value.

3. The method according to claim 2, further comprising:
   in response to obtaining the third value for the third parameter, selecting, by the extraction circuitry, a fourth parameter from the server parameter dataset; and
   obtaining a fourth value for the third parameter,
   wherein generating the pseudo-random number is further based on the fourth value.

4. The method according to claim 1, further comprising:
generating, by the computing device, a data seed based on the pseudo-random number, wherein the session identifier comprises the generated data seed.

5. The method according to claim 1, wherein the session identifier comprises the pseudo-random number.

6. The method according to claim 1, further comprising, transmitting, by the computing device, the session identifier to an external device.

7. The method according to claim 1, wherein obtaining the first value comprises querying, by the computing device, a server parameter dataset storing one or more previously acquired server parameters of the computing device.

8. The method according to claim 1, wherein obtaining the second value comprises querying, by the computing device, the server parameter dataset storing one or more parameters of the computing device to identify a value corresponding to the selected second parameter, wherein the second value comprises the identified value.

9. The method according to claim 8, wherein obtaining the second value comprises generating a value corresponding to the identified second parameter in response to selection of the second parameter.

10. An apparatus for generating pseudo-random numbers, the apparatus comprising:
communications circuitry configured to receive an instruction to generate a session identifier from a first user device associated with a first user;
session establishment circuitry configured to determine that the request for the session identifier requires a pseudo-random number;
extraction circuitry configured to:
select a first parameter from a server parameter dataset,
select a second parameter from the server parameter dataset,
obtain a first value for the first parameter, and
obtain a second value for the second parameter; and
transformation circuitry configured to generate the pseudo-random number based on the first value and the second value,
wherein the session establishment circuitry is further configured to generate the session identifier based upon the pseudo-random number,
wherein the communications circuitry is further configured to transmit the session identifier to the first user device.

11. The apparatus according to claim 10, wherein:
the extraction circuitry is further configured to:
select a third parameter from a server parameter dataset,
obtain a third value for the third parameter, and
the transformation circuitry is further configured to generate the pseudo-random number based on the third value.

12. The apparatus according to claim 11, wherein:
the extraction circuitry is further configured to:
select a fourth parameter from a server parameter dataset,
obtain a fourth value for the fourth parameter, and
the transformation circuitry is further configured to generate the pseudo-random number based on the fourth value.

13. The apparatus according to claim 10, wherein the session establishment circuitry is further configured to generate a data seed based on the pseudo-random number, wherein the session identifier comprises the generated data seed.

14. The apparatus according to claim 10, wherein the session identifier comprises the pseudo-random number.

15. The apparatus according to claim 10, wherein the apparatus is further configured to transmit the session identifier to an external device.

16. The apparatus according to claim 10, wherein the apparatus is further configured to query a server parameter dataset storing one or more previously acquired server parameters of the computing device to obtain the first value.

17. The apparatus according to claim 10, wherein the apparatus is further configured to generate a value corresponding to the first parameter in response to selection of the first parameter.

18. The apparatus according to claim 10, wherein the apparatus is further configured to query the server parameter dataset storing one or more parameters of the computing device to identify a value corresponding to the selected second parameter, wherein the second value comprises the identified value.

19. The apparatus according to claim 10, wherein the apparatus is further configured to generate a value corresponding to the identified second parameter in response to selection of the second parameter.

20. A non-transitory computer-readable storage medium for using an apparatus to generate a pseudo-random number, the non-transitory computer-readable storage medium storing instructions that, when executed, cause the apparatus to:
receive an instruction to generate a session identifier from a first user device associated with a first user;
determine that the request for the session identifier requires a pseudo-random number;
select a first parameter from a server parameter dataset;
obtain a first value for the first parameter;
select a second parameter from a server parameter dataset;
obtain a second value for the second parameter;
generate the pseudo-random number based on the first value and the second value;
generate the session identifier based upon the pseudo-random number; and
transmit the session identifier to the first user device.

* * * * *